July 11, 1939.   F. AUTEM   2,165,527
COUNTING DEVICE
Filed Nov. 6, 1936   4 Sheets-Sheet 1

INVENTOR:
Fred Autem,
BY
ATTORNEY.

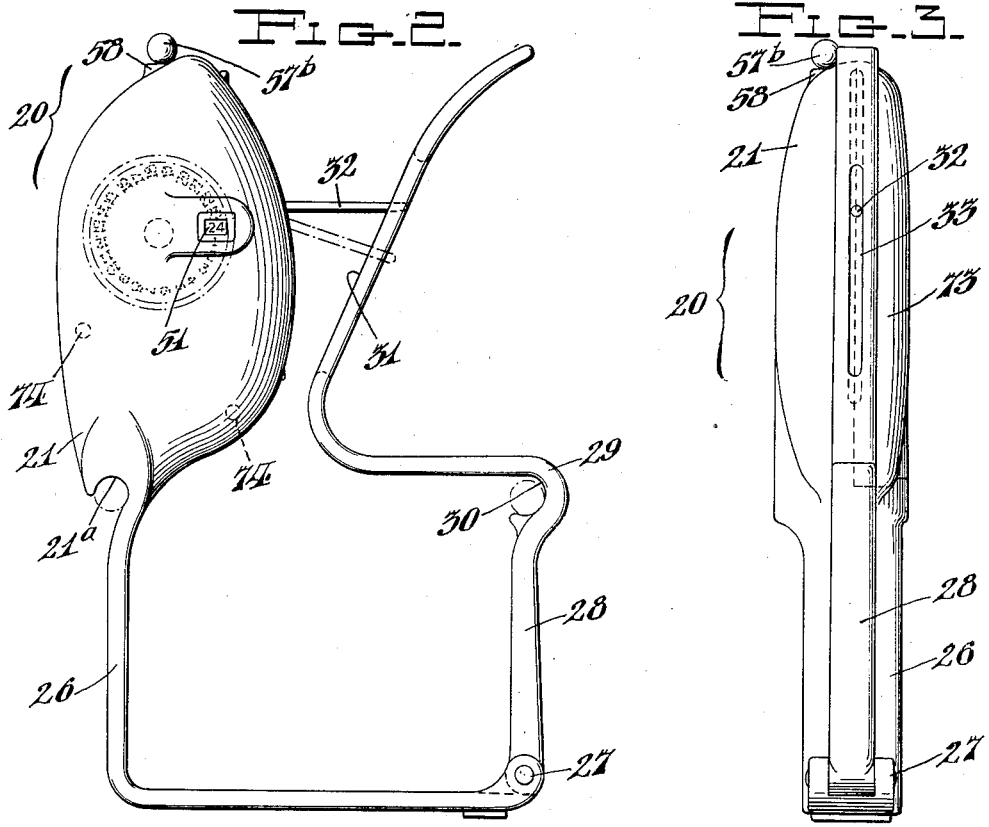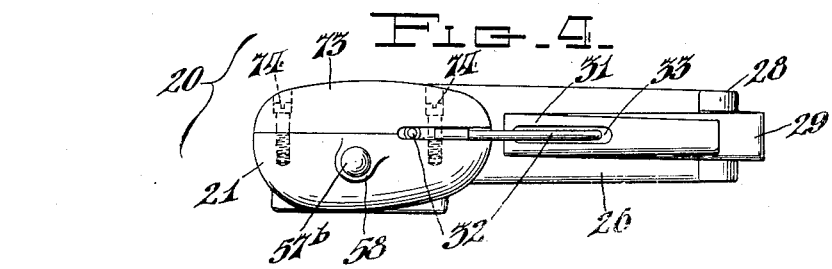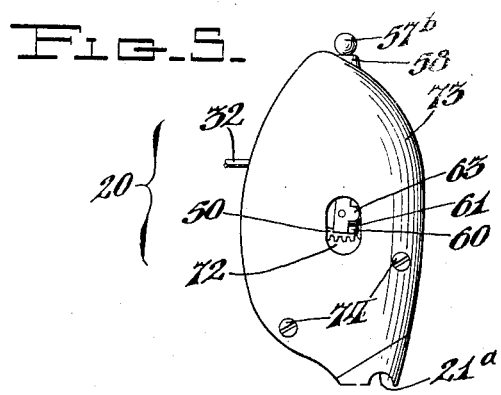

July 11, 1939.  F. AUTEM  2,165,527
COUNTING DEVICE
Filed Nov. 6, 1936  4 Sheets-Sheet 3
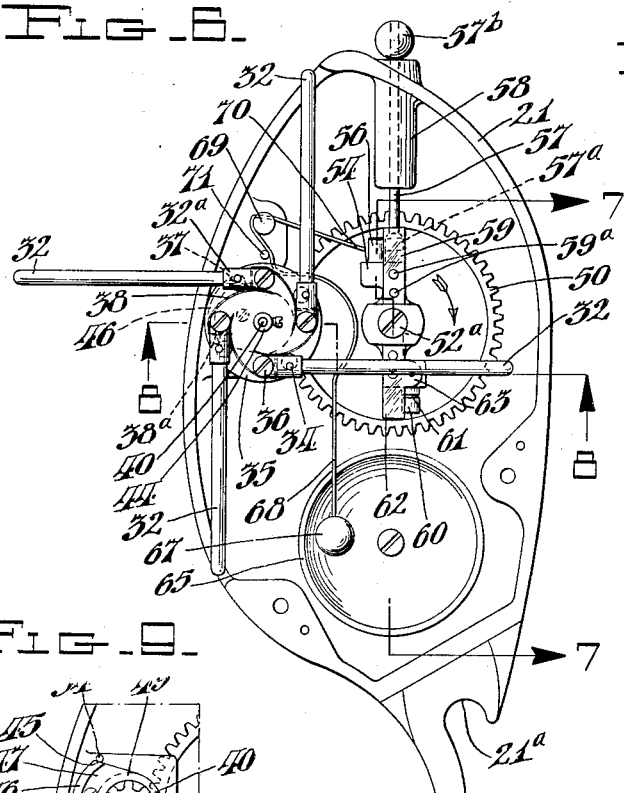
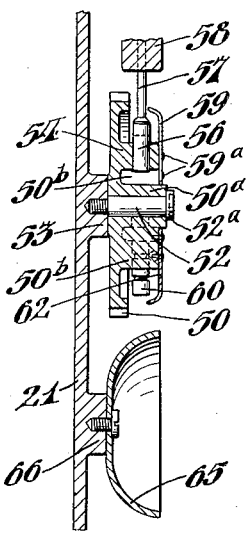
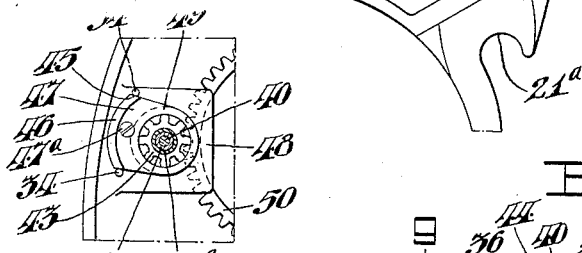
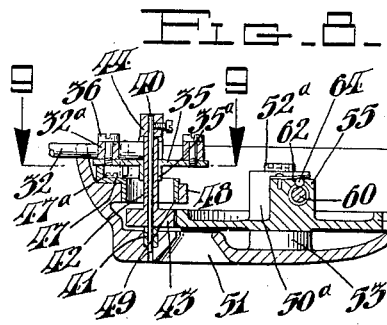
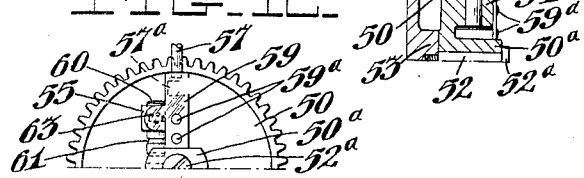
INVENTOR:
Fred Autem,
BY
ATTORNEY.

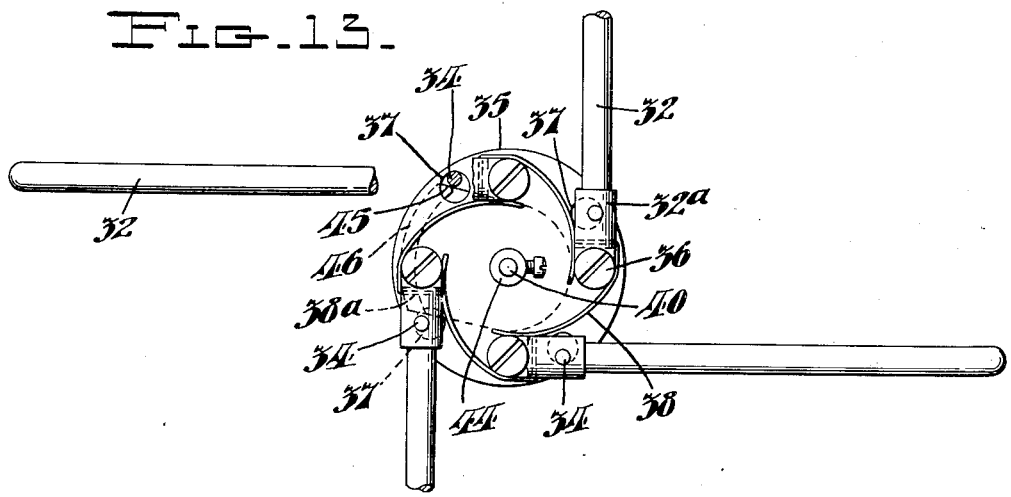
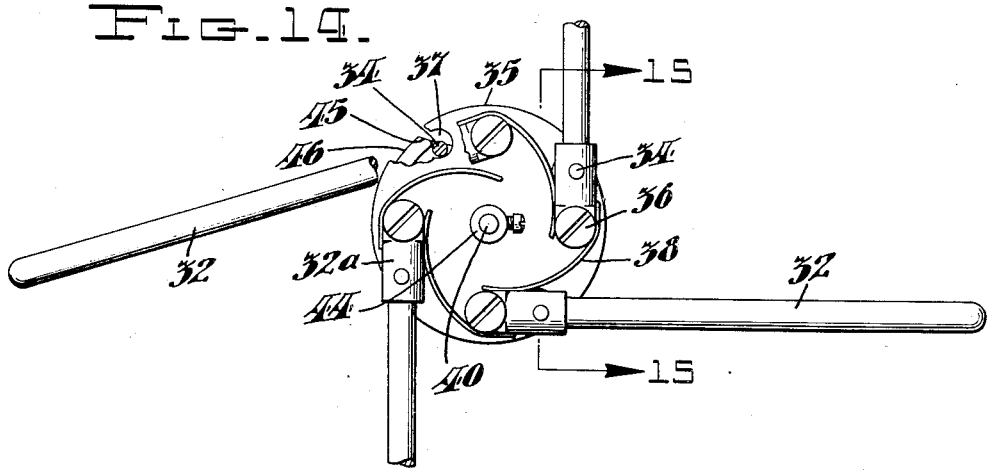
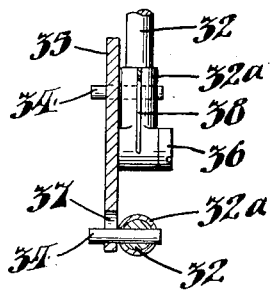

Patented July 11, 1939

2,165,527

UNITED STATES PATENT OFFICE 2,165,527

COUNTING DEVICE

Fred Autem, Wyomissing, Pa., assignor to Textile Machine Works, Wyomissing, Pa., a corporation of Pennsylvania Application November 6, 1936, Serial No. 109,438

6 Claims. (Cl. 235—98)

My invention relates to a meter and more especially to one adapted to tally or count articles of flexible character such as articles of wearing apparel, including stockings and the like.

An object of my invention is to provide a novel meter for counting stockings or other flexible articles, which shall be durable, accurate, capable of rapid operation, and adapted to be economically manufactured.

Another object of my invention is to provide a meter adapted to be quickly and easily mounted or dismounted from a stocking rack and like devices on which flexible articles are conveniently placed.

Another object of my invention is to provide a meter adapted to interrupt the counting operation after either a given number of articles have been tallied or after a fraction of such number have been tallied.

A further object of the invention is to provide a device whose efficiency and speed of operation exceeds that of devices heretofore provided for counting stockings or flexible articles.

With these and other objects in view, which will become apparent from the following detailed description of the illustrative embodiments of the invention shown in the accompanying drawings, my invention resides in the novel elements, features of construction, mechanisms and combinations of elements arranged in cooperative relation, as hereinafter more particularly pointed out in the claims.

In the drawings—

Fig. 2 is an elevation of the meter shown in Fig. 1 in operative position;

Fig. 3 is an elevation taken from the right of Fig. 2;

Fig. 4 is a plan view of the meter shown in Figs. 2 and 3;

Fig. 5 is a fragmentary elevation, on a reduced scale, showing the opposite side of the meter from that shown in Fig. 2;

Fig. 6 is a view, similar to Fig. 5 and enlarged relative thereto, and having the cover of the casing removed to illustrate the parts within the case of the meter;

Fig. 7 is a fragmentary section taken on the line 7—7 of Fig. 6;

Fig. 8 is a fragmentary section taken on the line 8—8 of Fig. 6;

Fig. 9 is a fragmentary elevation taken on the line 9—9 of Fig. 8;

Fig. 10 is a fragmentary elevation showing parts appearing in Fig. 6, but in different relative positions;

Fig. 11 is a fragmentary section taken on the same line as Fig. 7, the parts being in different relative positions;

Fig. 12 is a fragmentary elevation illustrating the same parts as Fig. 10 but the parts being in different relative positions.

Fig. 13 is an elevational view, in enlarged detail, of parts as viewed near the left of Fig. 6;

Fig. 14 is a view, similar to Fig. 13, showing certain parts in different positions; and Fig. 15 is a section taken substantially along the line 15—15 of Fig. 14.

Figure 1:
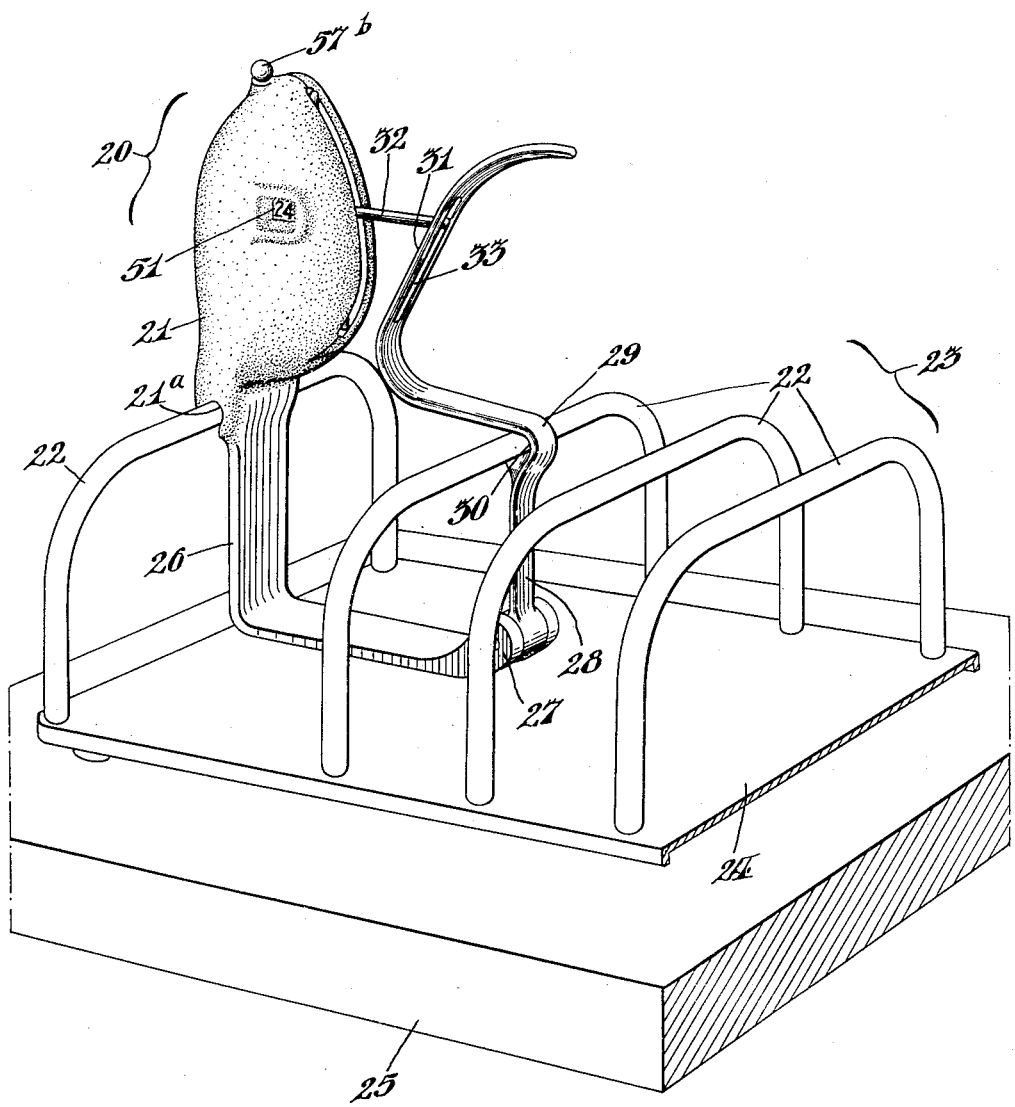
Figure 1 is a perspective view, on a reduced scale, showing a meter in accordance with my invention positioned for operation on a stocking rack.

A meter in accordance with my invention comprises a counter geared to a series of revolvably mounted arms by gearing causing the counter to register each time the arms are revolved by an angular distance equal to that between adjacent arms. A meter in accordance with my invention does not require that the movement of any part be reversed in use, the rotation of the counter being normally always in the same direction, and includes means for forcing a pause between each two successive registrations of the counter and means for preventing the counter from rebounding. Preferably my meter also includes means acting to normally prevent the arms and counter from being turned in one direction so that the registration of the counter will not be accidentally disturbed or the count falsified by rebound when the arms are moved rapidly. Preferably the meter in accordance with my invention also has releasable means for interrupting the rotation of the arms and counter after a certain number has been tallied by the counter, said means, upon release, permitting the counter to continue revolving in the same direction as before. A meter within my invention preferably includes also a pair of sockets adapted to receive supporting bars and one of said sockets being formed in a part hinged to the remainder of the meter to facilitate applying the meter to and removing it from a support having parallel bars or standards thereon.

In the meter 20 illustrated in the drawings, a flatened casing 21 of the meter has its lower end formed to provide a notch or socket 21a adapted to receive the horizontal run of one of the parallel U-shaped standards 22 of a stocking rack 23, the base 24 of which is shown in Fig. 1 as resting on a table 25. The casing 21 has also a right angled arm 26 depending therefrom, the lower portion of which extends horizontally to the right of the meter case as viewed in Figs. 1 and 2 and has hinged thereto at 27 a second arm 28, lower portion of which is vertical when in use. At point 29, arm 28 has a right angled bend so that, when in use, the arm 28 extends from point 29 to the left toward case 21. At point 29, arm 28 also has a socket or notch 30 adapted to receive the standard 22 adjacent to the one received in the socket 21a of case 21. The meter can therefore be quickly and conveniently mounted on parallel bars similar to the top runs of standards 22 whenever the horizontal dimension of arm 26 approximates the horizontal distance between two of such standards. From the point 29, the arm 28 extends horizontally to a point approximately adjacent to the lower portion of casing 21 and there recurves upwardly and outwardly away from said casing forming a downwardly tapering chute 31 through which the stockings or other articles may be conveniently passed in order to count them or tally them on meter 20.

The meter 20 has a set of four arms 32 intended to rotate in a given direction only, which is counterclockwise as viewed in Figs. 6, 13 and 14, and to project through slot in casing 21 into chute 31 one after the other. Arms 32 are mounted to turn downwardly through chute 31. Arms 32 are spaced at equiangular distances around an axis within case 21 about which they are revoluble, but casing 21, as shown in Figs. 1, 2 and 6, is of flattened and somewhat irregularly oval shape and the arms 32 are so arranged that when one of them extends horizontally into the upper portion of chute 31 the others are substantially hidden within the case 21. Therefore, there is substantially no opportunity for the arms 32 not in position to be used in counting to catch on anything, or to interfere with the counting operation in any way. Also, the arm 32 lying in the upper horizontal position projects into a slot 33 (Figs. 3 and 4) in the outwardly flaring upper portion of hinged arm 28. The arm 32 in active position therefore is not only protected at its end from accidental contact, but it is placed so that no article can pass down through the chute from top to bottom without moving the arms 32 an angular distance equal to that between two adjacent arms. In the arrangement shown, arms 32 are four in number so that it is necessary to turn the arms 90° at each operation to turn the counter from one numeral to the next.

In the meter 20, the arms 32 are fastened at their inner ends in hubs 32a by pins 34 and hubs 32a are pivotally mounted on a disk 35 by screws 36. The movement of arms 32 on their pivots 36 is, however, limited by the contact of pins 34 with the sides of apertures 37 in disk 35 into which pins 34 extend. In order to bias the arms 32 to a desired position, springs 38 are fixed on hubs 32a at one end by extending into holes in the hubs at right angles to the arms 32 as shown in dotted lines at 38a (Figs. 6 and 13). The other ends of springs 38 are bent around in arcs toward the center of disk 35 and each sprung past a hub 32a and against the side of such hub, said hubs each being notched or scored in line with, and under, one of the springs, at substantially the position of the lower end of the spring 38 in Fig. 15 to insure that the ends of the spring will not slide out of place. The arrangement is such that the springs 38 keep the arms 32 normally swung out to the position shown in Figs. 1, 6 and 13 and in which they are perpendicular to radii of the disc 35 passing through the centers of pivots 36. However, the engagement between the pins 34 and the apertures 37 is so arranged that the springs 38 are unable to move the free ends of arms 32 past the position in which the arms are perpendicular to radii through their pivots 36.

The disk 35 is mounted to revolve about a fixed axle 40 having a close fit in a bushing 41 (Fig. 8) which is forced into a correspondingly shaped recess in the case 21. The hub 35a of disk 35 is soldered to a long sleeve 42 integral with a pinion 43 which is revolubly mounted on axle 40 and positioned thereon in one direction by contact with the bushing 41 and in the other direction by a collar 44 which is removably fixed to axle 40 by a set screw.

The disk 35 is prevented from turning more than 90° at a time by an abutment surface 45 which lies at one end of an arcuate rib 46 (Figs. 8, 9, 13 and 14) which is coextensive with a portion of the circle described by pins 34 when arms 32 are in their outermost positions perpendicular to radii of the disk 35. The pins 34 strike against abutment 45 as the disk is turned, thereby forcing the disk to stop until each pin in turn can be moved to avoid the rib 46. The disk 35 and the counter geared thereto therefore cannot be spun and the tally is always correct irrespective of the force with which an article to be tallied is thrust upon the arm 32. When, however, pressure is exerted on the particular arm 32 which happens to extend horizontally from casing 21, its spring 38 yields so that the arm affected swings down from the position of Fig. 13 to the position of Fig. 14, thereby releasing its pin 34, as indicated in Fig. 14, from abutment 45. The pin 34 moves inside rib 46, as disk 35 is revolved counterclockwise, to the other end of the rib. Further, rib 46 extends through an angle of 90° so that the pin 34 of the arm 32 which has just been turned to point downwardly, lower left hand pin 34 in Fig. 13, lies against the other end of the rib, thereby preventing any rebound in case one of the pins 34 should strike the forward edge of rib 46 more or less violently. The tally is therefore guarded against errors from any such cause.

The rib 46 is shown as integral with a plate 47 which is fixed on one face of a flange 48 within casing 21 by a screw 47a. The plate 47 has a cylindrical portion 49 which fits an aperture in the flange 48 and helps to anchor plate 47 in place. Further, the cylindrical portion 49 is apertured to permit the passage of axle 40 and sleeve 42 therethrough.

The pinion 43 carries eight teeth which mesh with the forty-eight teeth on the number wheel or counter 50. Wheel 50 has a series of equally spaced numerals on the side thereof running consecutively from 1 to 24. Therefore, each time one of the arms 32 is moved to turn disk 35 through 90°, the pinion 43 is also turned 90°, or a distance equal to the angle of two teeth and the wheel 50 thereby turned two teeth or one twenty-fourth of a revolution to step it from the registering position of one numeral to that of the next higher one. Casing 21 of the meter 20 has an opening or dial aperture 51 therein (Figs. 1 and 2) through which the numerals on wheel 50 are visible one at a time when in register therewith to indicate the meter reading.

Wheel 50 has a hub 50a (Fig. 7) which is mounted to turn on heavy pivot pin 52 having an end threaded into a boss 53 on the inner face of casing 21 and having also a head 52a to hold wheel 50 against axial displacement.

As stockings are ordinarily packaged either twelve or twenty-four in a bundle, I have provided means whereby the meter is automatically temporarily disabled whenever it has turned so as to register twenty-four, and also means usable at the option of the operator for temporarily disabling the meter whenever it registers twelve. For carrying out the first of said purposes, I have provided an arrangement which includes parts also used in carrying out the second of said purposes and which comprises alined radial flanges 50b on the inside of wheel 50 away from boss 53, and at the outer ends of flanges 50b I have placed lugs 54 and 55, Fig. 10, offset at right angles thereto. Both of lugs 54 and 55 are apertured to receive stop members. The stop member in lug 54 is shown at 56 (Fig. 11) and has the form of a stout pin or post pressed tightly into an aperture in the lug 54 and projecting radially outward therefrom. Post 56 lies somewhat at one side of the plane of the body of wheel 50 and describes a path which passes through the normal position of an abutment pin 57, the head 57a of which is larger than the shank. Pin 57 is mounted to move radially of pin 52 in a hollow guide 58, Fig. 6, integral with casing 21, and pin 57 has at its outer end a ball handle 57b which normally rests against the flat top of the guide 58. When the meter is in use, the ball 57b lies near the extreme top of casing 21 and pin 57 is vertical so that its weight causes it to hang in the path of post 56. Post 56 is substantially parallel to a radius of wheel 50 and its side strikes the head 57a to stop wheel 50 just after the numeral 24 is central in the window 51. The operator then takes the dozen pairs of the articles which have been counted from the horizontal part of arm 26 and places them in one of the compartments of rack 23. He then raises the ball handle 57b thereby causing head 57a to press aside what is at the time the upper end of a leaf spring 59, Figs. 7 and 11, the inner end of which is fastened by pins 59a, to one of the radial flanges 50b of the wheel 50. The curved outer end of spring 59 thereupon jumps laterally beneath the edge of head 57a as shown in Fig. 11. The spring 59, however, does not curve toward the pin 57 enough to contact the shank of the pin and therefore does not interfer with movement of post 56 into contact with head 57a. The head 57a being in elevated position and out of the path of post 56, wheel 50 is then free to move to register numeral 1 whenever pressure is exerted on the outward extending arm 32 and the head 57a will then drop into contact with the outer end of post 56. When wheel 50 is turned another one twenty-fourth of the circumference, the numeral 2 registers with window 51 and the post 56 and pin 57 are entirely clear of each other.

As illustrated, a means is provided for similarly but optionally stopping wheel 50 when the numeral 12 is in the window 51. The lug 55, Fig. 10, has slidably mounted therein a post 60 which is adapted to occupy either the potion shown in Fig. 10 in which its path intersects the head 57a or the position shown in Fig. 12 and in which it turns past the inner end of pin 57 without interference. In order to hold post 60 optionally, in either position, it is grooved at two points 61 intermediate the ends of post 60; and a spring 62, which corresponds to spring 59 so far as pin 57 is concerned, has an offset arm 63 which has a ball 64 therein which lies in a recess of the same shape in lug 55 and is pressed by spring 62 to engage either groove 61 as desired. In order that the movable post 60 may be shifted as desired the casing has a central opening 72 (Fig. 5) in the side opposite aperture 51 through which a screw driver or other convenient tool may be introduced to push post 60 into either active or inactive position.

It is desired often to have an audible signal sounded whenever one of posts 56 or 60 approaches pin 57 to call the operator's attention to the fact that a bundle has been counted out and that no attempt must be made to turn the arms 32 until handle 57b has been raised. For this purpose, I have provided a gong 65, Figs. 6 and 7, fastened to a boss 66 on the inner face of casing 21. A clapper 67 for gong 65 is fixed to one end of a spring wire 68 which holds clapper 67 normally close to but not touching the inner face of gong 65 near its rim. The spring wire 68 is supported by a sleeve rotatable on post 69, wire 68 passing through a hole in the sleeve and being soldered therein. From post 69 wire 68 extends to a point 70 in the path of the post 56 and in the path of the post 60 when the latter is in its outer position as shown in Fig. 10. Wire 68 on the other side of post 69, lies normally against pin 71, passing between post 69 and pin 71 so that, when post 56 or 60 passes it, post 60 being in its outer position, the wire 68 and clapper 67 are swung counterclockwise as viewed in Fig. 6, thereby lifting clapper 67. When end 70 loses contact with post 56 or 60, the clapper falls and bends wire 68 around pin 71 enough to strike gong 65, the clapper immediately bounding back and permitting the gong to sound without the damping which would be caused by continued contact of the clapper with the gong.

The casing 21 has a section 73, Fig. 5, which is removable, being held normally in place by screws 74, whereby the movable parts of the meter may be assembled within said casing and inspected whenever desired. It will be understood that wherever the word "counter" is used in the foregoing description or in the claims hereinbelow the number wheel 50 or its equivalent is referred to.

Of course, the improvements shown and described, by which I obtain the above results, can be changed and modified in various ways without departing from the scope of the invention herein disclosed and hereinafter claimed.

What I claim is:

1. In a counting device, a rotatable element, a plurality of arms on said element each having an individual axis and arranged for limited movement relative to said element, a projection on each of said arms extending at right angles to the plane of rotation thereof, an abutment, and a spring for each arm to hold it normally to cause said projection to contact with said abutment, said abutment and arms arranged so that pressure on the arm held by the abutment in the direction to move said rotatable element in the proper direction releases said projection from the abutment.

2. In a counting device, a rotatable element, a plurality of arms on said element, each of said arms arranged for limited movement relative to said element on an individual pivot and each having a part projecting at right angles to the plane of its rotation, an abutment, a spring arranged to throw each arm to bring said projection into contact with said abutment, said abutment and arms arranged so that pressure on the arm held by the abutment in a direction to move said rotatable element in the proper direction releases said projection from the abutment, a casing for said device, and a second abutment arranged to engage one of said projections on an arm substantially within the casing to prevent rebound of the arms in the wrong direction.

3. In a counting device, a rotatable element, a plurality of arms each pivoted to said element for limited movement relative thereto on an individual pivot and having a part projecting at right angles to the plane of its rotation, a casing supporting said rotatable element, an arcuate rib supported within said casing of an angular length equal to that between pivots of adjacent arms, a spring for each of said arms tending to throw it into radial position with respect to its axis of rotation, and means whereby said springs hold said arms releasably in positions causing said projections to contact first one end and then the other of said rib during rotation of said element and whereby pressure on an arm the projection of which is in contact with an end of said rib in the counting direction, turns said contacting arm a limited distance on its pivot to release the projection from contact with the end of the rib.

4. A device for counting flexible articles, comprising a rotatable element, a plurality of arms pivoted individually to said element to have arcuate movement relative to the element, a pin on each of said arms projecting laterally from the plane of rotation of said element, the latter supporting stops for said pins against movement of the free ends of the arms relative to the element for more than a limited degree in either direction, springs for throwing said arms to hold said pins normally against the stops, escapement means arranged to contact both of an adjacent pair of pins when in normal position to prevent movement of said element in either direction, said arms being movable inwardly against the action of the springs whereby the pins pass said escapement means.

5. In a counting device, a revoluble element, a plurality of arms each pivoted to said element for a limited movement on an individual pivot and having a part projecting at right angles to the plane of rotation of said element, a casing supporting the axis of rotation of said element, spring means acting continuously on each of said arms tending to throw it into radial position with respect to its axis of rotation, means individual to each of said arms limiting its movement in response to said spring means, and escapement means providing stops the same angular distance apart as two adjacent pivots for said arms, said stops arranged to contact the said parts at right angles of two arms simultaneously when the arms are in the positions defined by said limiting means.

6. In a counting device, a casing, an axle fixed to said casing, an element mounted to revolve on said axle, arms mounted on said element for limited pivotal movement with respect thereto and adapted to turn the element, projections extending laterally of said arms, an arcuate stop member arranged in position to contact two adjacent ones of said projections to hold said element against accidental rotation in both directions, a flange on said casing having an aperture through which said axle extends, and a portion fixed to said stop member and extending to have contact with the inner face of said aperture to assist in holding the stop member in desired position.

FRED AUTEM.